(12) United States Patent
Visintin et al.

(10) Patent No.: US 9,871,428 B2
(45) Date of Patent: Jan. 16, 2018

(54) METHOD FOR REMOVING BARS OR COILS FROM SLOTS OF AN ELECTRIC MACHINE

(71) Applicant: ALSTOM Technology Ltd, Baden (CH)

(72) Inventors: Massimiliano Visintin, Zurich (CH); Janusz Bialik, Nussbaumen (CH); Luigi Cattaneo, Milan (IT)

(73) Assignee: General Electric Technology GmbH, Baden (CH)

( * ) Notice: Subject to any disclaimer, the term of this patent is extended or adjusted under 35 U.S.C. 154(b) by 246 days.

(21) Appl. No.: 14/576,785

(22) Filed: Dec. 19, 2014

(65) Prior Publication Data

US 2015/0101182 A1    Apr. 16, 2015

Related U.S. Application Data

(63) Continuation of application No. PCT/EP2013/063906, filed on Jul. 2, 2013.

(30) Foreign Application Priority Data

Jul. 3, 2012   (EP) .................................... 12425120

(51) Int. Cl.
| | |
|---|---|
| *H02K 15/02* | (2006.01) |
| *H02K 15/00* | (2006.01) |
| *H02K 15/06* | (2006.01) |
| *H02K 15/12* | (2006.01) |

(52) U.S. Cl.
CPC ....... *H02K 15/0006* (2013.01); *H02K 15/024* (2013.01); *H02K 15/062* (2013.01); *H02K 15/12* (2013.01); *Y10T 29/49009* (2015.01); *Y10T 29/49012* (2015.01)

(58) Field of Classification Search
CPC ...... B29C 45/14; B41F 27/12; B41F 27/1206; Y10T 29/5313; Y10T 29/53274; Y10T 29/49009; Y10T 29/49012; H02K 15/0006; H02K 15/024; H02K 15/062; H02K 15/12
See application file for complete search history.

(56) References Cited

U.S. PATENT DOCUMENTS

| | | | |
|---|---|---|---|
| 2,939,209 A | 6/1960 | Schwartz | |
| 3,633,891 A | 1/1972 | Heran et al. | |
| 4,218,818 A | 8/1980 | Panzica | |
| 6,840,749 B2 * | 1/2005 | Klee ..................... | H02K 15/12 |
| | | | 425/116 |

(Continued)

FOREIGN PATENT DOCUMENTS

| | | |
|---|---|---|
| DE | 222 338 A1 | 5/1985 |
| EP | 0 122 217 B1 * | 1/1988 |

(Continued)

OTHER PUBLICATIONS

The International Search Report and the Written Opinion of the International Searching Authority for PCT/EP2013/063906 dated Aug. 1, 2013.

*Primary Examiner* — Carl Arbes
(74) *Attorney, Agent, or Firm* — GE Global Patent Operation; Rita D. Vacca

(57) ABSTRACT

The method for removing a bar or coil from a slot of an electric machine includes weakening the bonding between the slot and the bar or coil, and then removing the bar or coil.

14 Claims, 5 Drawing Sheets

(56) References Cited

U.S. PATENT DOCUMENTS 9,032,618 B2 * 5/2015 Baumann ............... H02K 15/12
                                                                                 29/596
2008/0284555 A1    11/2008  Levit et al.

FOREIGN PATENT DOCUMENTS

| | | | |
|---|---|---|---|
| EP | 2 339 722 A1 * | 6/2011 | |
| GB | 2 189 575 A | 10/1987 | |
| JP | 53 025803 A | 3/1978 | |
| JP | 6 121495 A | 4/1994 | |
| WO | 02/065622 A1 | 8/2002 | |
| WO | 2013/139886 A2 * | 9/2013 | |

\* cited by examiner

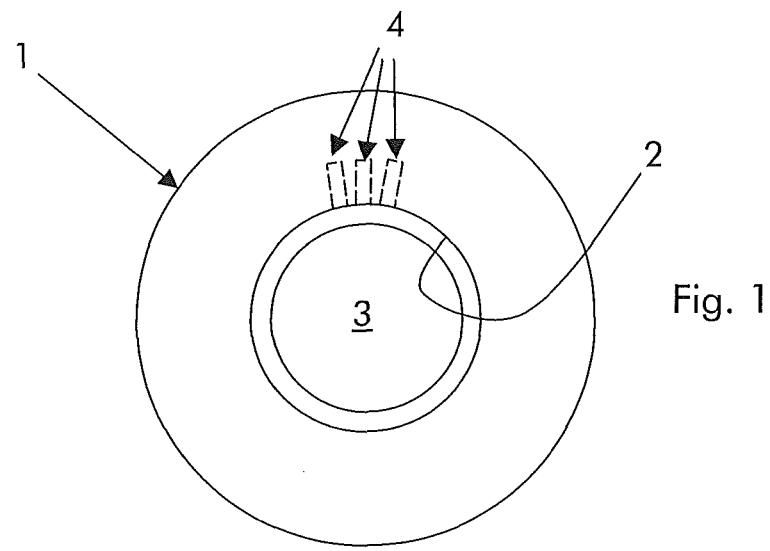
Fig. 1
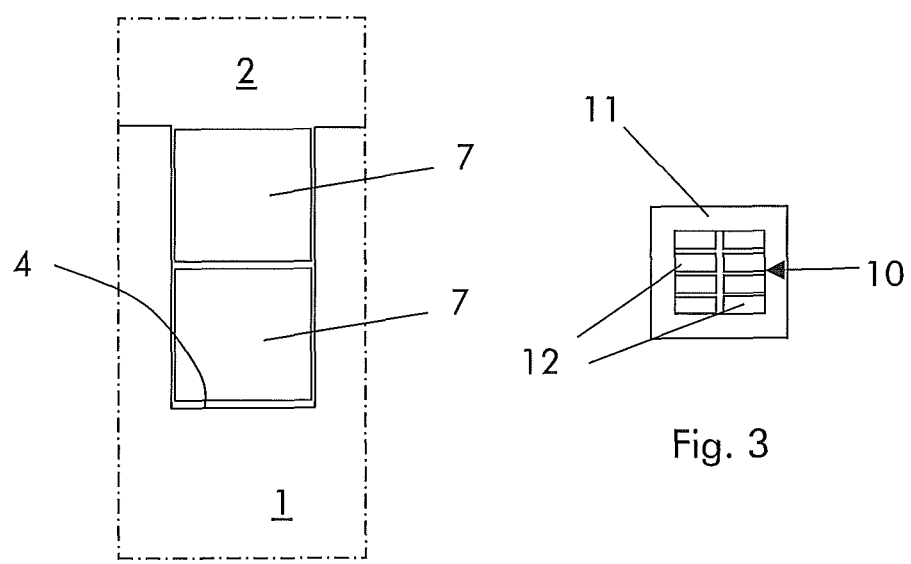
Fig. 3
Fig. 2

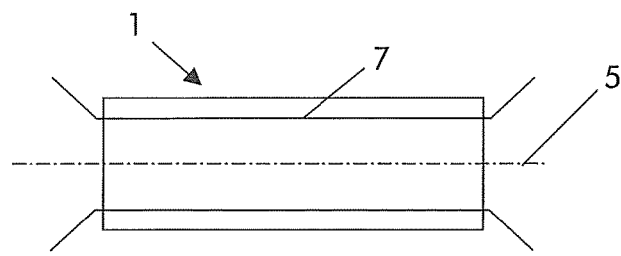
Fig. 4
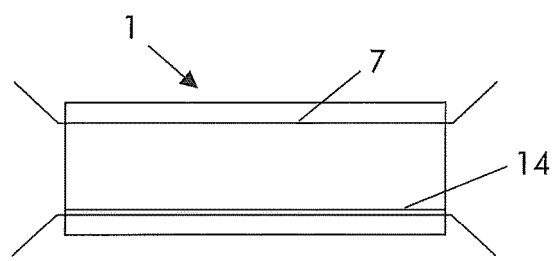
Fig. 5
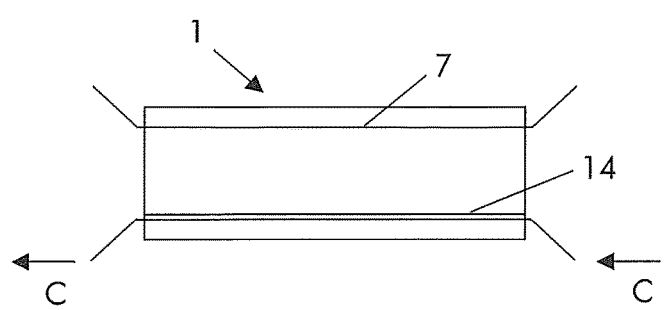
Fig. 6
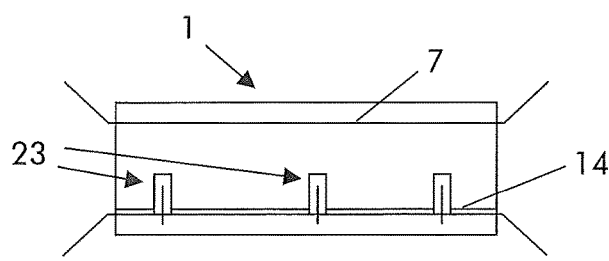
Fig. 7
Fig. 8
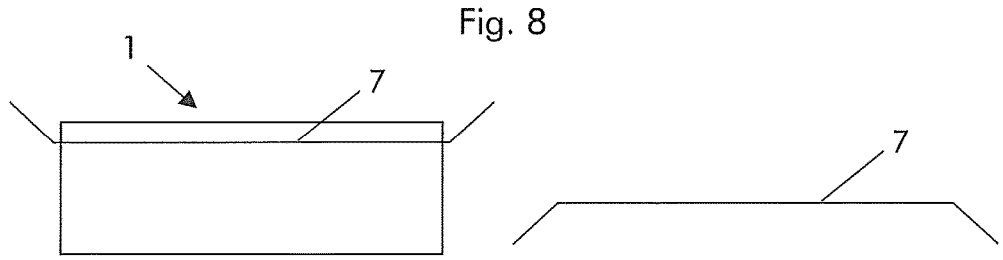

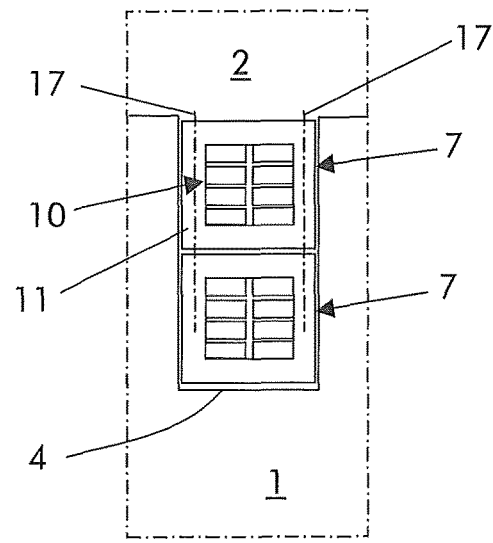
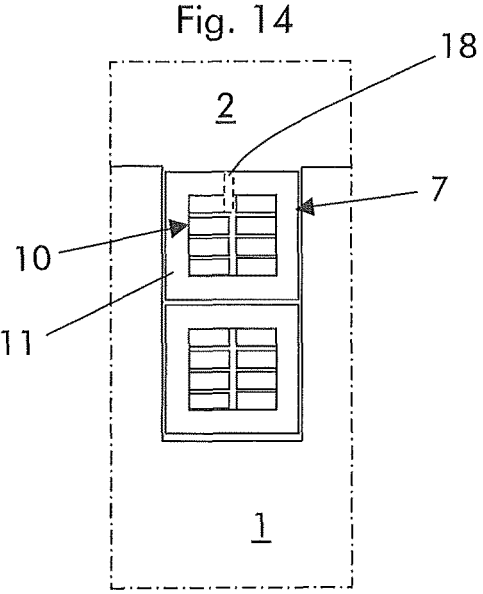
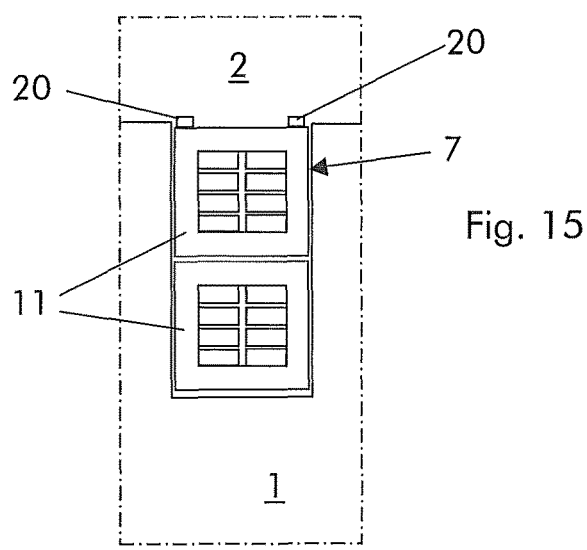
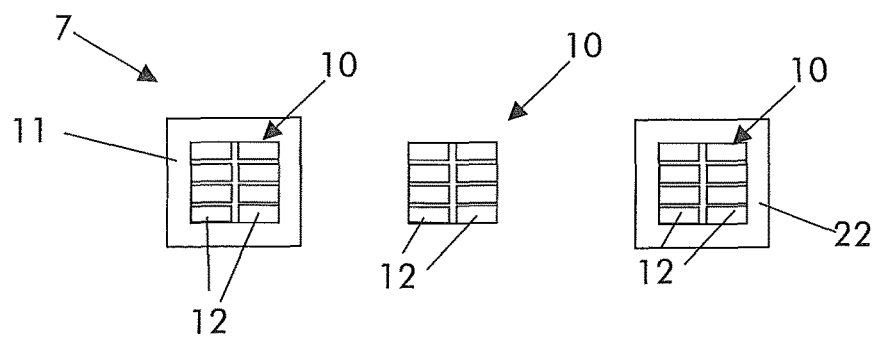
Fig. 16

METHOD FOR REMOVING BARS OR COILS FROM SLOTS OF AN ELECTRIC MACHINE

CROSS-REFERENCE TO RELATED APPLICATIONS

This application claims priority to PCT/EP2013/063906 filed Jul. 2, 2013, which claims priority to European application 12425120.8 filed Jul. 3, 2012, both of which are hereby incorporated in their entireties.

TECHNICAL FIELD

The present disclosure relates to a method for removing bars or coils from slots of an electric machine.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

Rotating electric machines such as electric motors or generators generally have an annular stator defining a stator bore that houses a rotor.

The stator includes a plurality of laminations insulated from one another and defining axial slots.

Within the axial slots bars are housed (usually one or two bars but also more bars can be housed in each slot); the bars are connected at their ends to define stator windings.

The bars include a conductor and insulation around it.

The conductor is usually defined by a plurality of transposed copper strands, each insulated from the others.

The insulation is usually defined by a mica tape impregnated with a resin.

The bars are firmly fixed in the slots so as to reduce the vibrations, thus preventing insulation damages and electric discharges within the slots.

The dielectric performances of the insulation deteriorate during operation, so that the electric machine could have a reduction of the expected lifetime.

This ageing depends on the design and operating conditions, as well as on the environmental conditions.

For this reasons, in some cases refurbishment is needed.

Refurbishment can include stator and/or rotor repair or a full rewind (e.g. replacement of the stator bars to provide a new winding) and can lead to a general lifetime extension of the electric machine.

In order to carry out the refurbishment or rewind, it is often needed to remove the bars.

In order to remove the bars, the bar ends that protrude from the stator core (the so called end windings) are first cut and removed.

Then, also the bar parts housed in the slots is removed.

In many cases the bars are firmly fixed in the slots, therefore consistent efforts are required to remove them.

Fixation is particularly strong in case of stator manufactured according to the Global Vacuum Pressure Impregnation process.

The Global Vacuum Pressure Impregnation process consists of introducing the stator with the bars already inserted in the slots into a tank; then resin is introduced into the tank, such that the whole stator is impregnated with it.

In these cases extraction of the bars from the slots is often performed through hydraulic extraction tool.

This traditional extraction method has some drawbacks.

In fact, this method is often time consuming, because during extraction breakage of the components (such as wires) used for extraction can occur. This requires the replacement of the broken components and the positioning of the new components.

SUMMARY

An aspect of the disclosure includes providing a method that permits removal of the bars from the slots of a stator in a faster way than the traditional processes.

These and further aspects are attained by providing a method in accordance with the accompanying claims.

The method can bring benefits when performing the bar or coil replacement, because it can allow bars or coils reuse after a proper reconditioning.

This can lead to reduction of the overall outages time in case of winding failures and can improve planned refurbishment.

Advantageously, according to the method of the disclosure the bars can be removed from the slots without damaging them (in particular the conductors thereof) and making them unusable, such that the bars (in particular the conductors thereof) can be reused after reconditioning.

BRIEF DESCRIPTION OF THE DRAWINGS

Further characteristics and advantages will be more apparent from the description of a preferred but non-exclusive embodiment of the method illustrated by way of non-limiting example in the accompanying drawings, in which:

FIG. 1 is a schematic front view of an electric machine;
FIG. 2 is a schematic cross section of a stator part;
FIG. 3 is a schematic cross section of a bar;
FIGS. 4 through 8 show the steps of a first embodiment of the method;
FIG. 13 shows a third embodiment of the method;
FIG. 14 shows a fourth embodiment of the method;
FIG. 15 shows a fifth embodiment of the method;
FIG. 16 shows further steps of the method to reuse the conductor of the bar.

DETAILED DESCRIPTION

Figure 9:
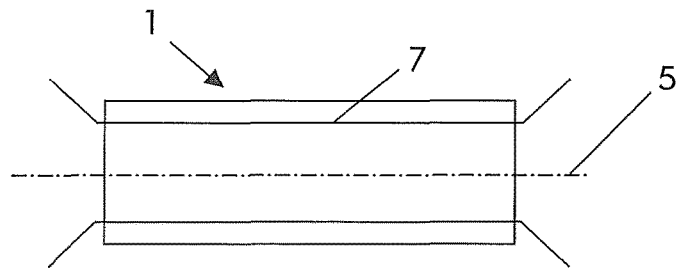
FIGS. 9 through 12 show the steps of a second embodiment of the method.
Figure 10:
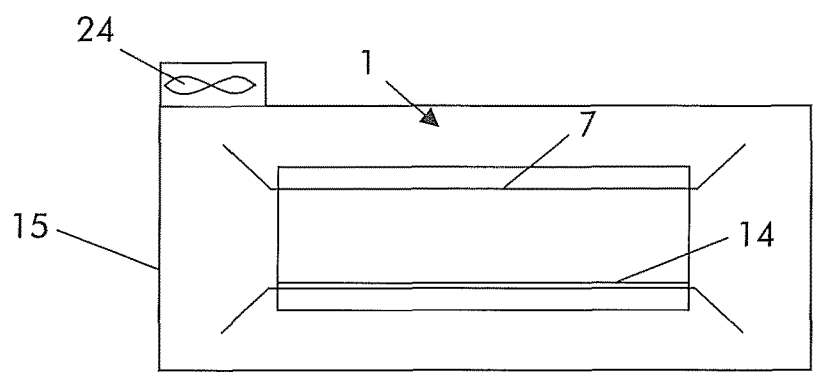
Figure 11:
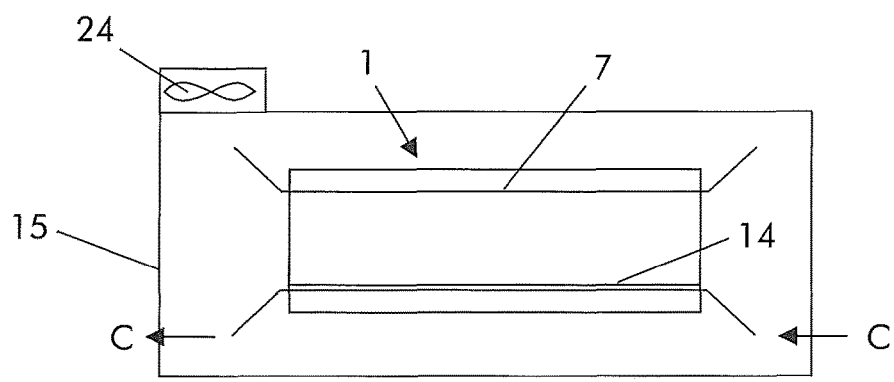
Figure 12:
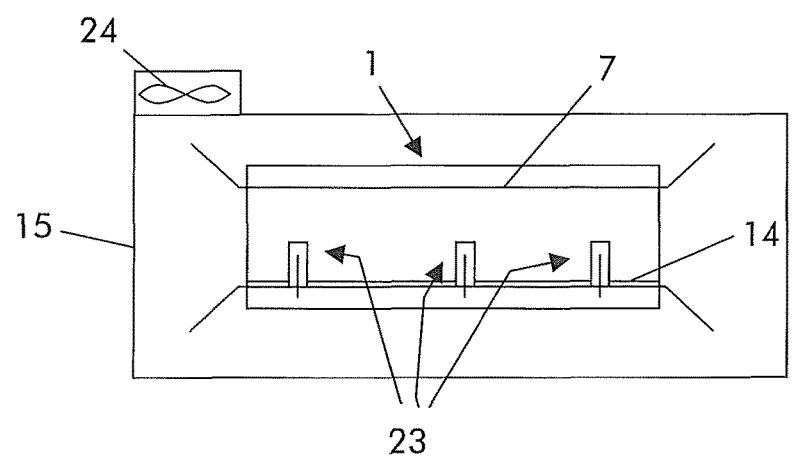
Figure 17:
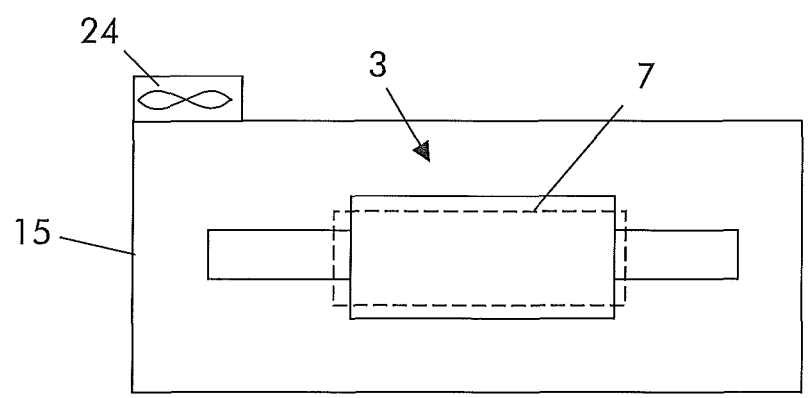
FIG. 17 shows an example of the method implemented on a rotor.

With reference to the figures, a stator 1 of an electric machine has an annular structure with a bore 2; in the bore a rotor 3 is housed.

The stator 1 has slots 4 that open in the bore 2 and extend parallel to the longitudinal axis 5 of the stator 1.

The slots 4 house one or more (usually two) bars 7. The bars 7 are usually placed one on top of the other. Also coils could be housed in the slots (usually for smaller machines); in the following specific reference to bars is made but it also includes coils.

The bars 7 include a conductor 10 and insulation 11 around it.

The conductor 10 can be either a solid bar or it can include a plurality of transposed strands (reference 12 indicates the strands) insulated from one another.

The insulation 11 usually includes a mica tape wrapped around the conductor and impregnated with a resin.

Different methods are known to impregnate the mica tape.

According to the so called Global Vacuum Pressure Impregnation process, the whole stator 1 with the bars 7 inserted into the slots 4 is introduced into a tank and is impregnated with a resin.

Stators realised according to this process have the bars 7 strongly bonded to the slots 4 and fixed by wedges as well.

A similar strong bonding can be obtained on bars, which have been repaired following a resin injection process.

Additional examples of processes that provide strong bonding between bars and slots exist.

In addition, similar benefits can be obtained for rotors.

According to the method of the disclosure, in order to remove the bars 7 from the slots 4, the bonding between the slot 4 and the bar 7 is weakened, and then the bars 7 are removed from the slots 4. Weakening leads to an easier and faster removal operation.

Different ways of weakening can be implemented.

Weakening can include heating one or more of the bars 7 or portions thereof.

For example heating includes defining a first temperature T1 and heating at least a portion of the bar at the first temperature T1 (or above the first temperature T1).

Preferably the first temperature T1 is above the glass transition temperature of the resin used for impregnation. With resins typically used for impregnation, the first temperature is between 90-130° C.

At the glass transition temperature the bonding of the bars 7 to the slots 4 is reduced, thus an easier and faster winding removal can be performed.

Heating can include making a current C (DC or AC current) to pass through at least a bar 7.

As an alternative or in addition to the current C through the bars 7, also laser beams or heat burners can be used. It is anyhow clear that other methodologies are possible too, like the capacitive heating of the main groundwall insulation of the bars by inducing a proper electric field in it.

In addition, the bar 7 or the portion thereof to be heated can be thermally insulated for example by thermal insulator 14.

In addition or as an alternative, the stator 1 can be covered with an envelope 15 and heating can include heating the whole stator 1 (or rotor) including the bars 7 housed in the slots 4 to a second lower temperature T2 than T1 and then further heating at least a portion of the bar 7 to reach the first temperature T1 or a temperature above the first temperature T1.

This methodology can lead to a quicker process to remove the bars 7 in case:

all bars 7 must be removed, and only few damaged bars 7 must be removed.

For example, heating to the first temperature T1 can include current C passing through at least a bar 7 or, as already explained, laser beams, heat burners, insulation heating, etc.

In this case the second temperature T2 can be between 40-90° C. and the first temperature T1 can be above (slightly above) the glass transition temperature, such as for example between 90-130° C.

Alternatively, weakening can include mechanical machining, such as cutting the bar 7.

Cutting can be performed with different cutting devices, among them rotating or alternating saws, however other cutting technologies can be adopted as well, like water jet or laser cutting.

In a first example cutting includes cutting the insulation 11 but not cutting the conductors 10 (reference 17 indicates the cut).

In fact, usually the insulation 11 extends between the conductor 10 and the slot 4. Preferably cutting includes at least partly cut the insulation 11 between the conductor 10 and the slot 4.

Alternatively cutting can also include cutting the insulation 11 and the conductor 10; reference 18 indicates this cut).

In case of cutting, vacuum cleaners or other means to collect the produced debris can be used.

As a further alternative, weakening includes providing a compound 20 on the insulation 11 to cause chemical decomposition thereof.

Advantageously according to the method extraction of the bar 7 from the slots 4 can be carried out without damaging the conductors 10, but only the insulation 11 (the electrical properties of the insulation are compromised anyway).

In these cases, the insulation 11 can be removed from the conductors 10 and a new insulation 22 can be provided around the conductors 10. The new bar provided with the new insulation 22 can thus be assembled into the slot 4.

After weakening, removal of the bars 7 from the slots 4 can be carried out in different ways.

For example, in case of stator with radial cooling channels, wire loops are provided within the cooling channels and around the bars. These wire loops are connected to stripping tools 23 (for example hydraulically or pneumatically operated).

In order to remove the bars 7 from the slots 4 the stripping tools 23 are activated and the bars 7 are stripped from the slots 4.

This way, the bars can be extracted without damaging (such as bent) at least the conductor 10, because the bonding has been weakened before stripping. Therefore the conductor 10 can be reused.

It is clear that in case wedges are used to close the slots, the present method can be used as well. In this case the wedges are preferably removed before the bars 7 are stripped.

In addition, even if the method has been described with reference to a stator a bars housed in stator slots, the method can be used for a rotor and bars housed in rotor slots as well.

In the following some specific examples are described in detail.

EXAMPLE 1

HEATING OF SINGLE BARS-FIGS. 4-8

The rotor 3 is removed from the stator 1 and the thermal insulator 14 such as an insulating layer is provided at the top of the slot 4.

Then current is provided into the bar 7 to be removed.

Current can be either DC or AC current according to the need and the features of the available current. Current flowing through the bar 7 heats it, such that the bonding features of the resin are weakened.

Thus the bar 7 is removed from the slot 4 through the stripping tools 23, such as hydraulic or pneumatic stripping tools.

EXAMPLE 2

HEATING OF THE WHOLE STATOR-FIGS. 9-12

The rotor 3 is removed from the stator 1 and the envelope 15 is provided to cover the whole stator 1. Thus heat air is introduced and is evenly distributed (for example by a fan 24) into the envelope 15, to heat the whole stator 1 (and thus also the bars 7 housed in the slots 4 of the stator 1) up to the second temperature T2.

Then current (either DC or AC current as explained in example 1) is induced in the individual bars 7, such that the insulation or parts thereof is heated at the first temperature T1 and the bar 7 is then removed.

After removal of a bar or a group of bars, the current is sent through another bar or another group of bars; these bars are thus removed.

The process is repeated if necessary until all the bars are removed.

This process is particularly useful in case a plurality of bars must be removed.

For example also in this case removal can be carried out via the stripping tool 23 such as those described in example 1. In this example, all the stripping tools 23 can be connected to the bar 7 that they have to remove before the whole stator 1 is heated. Alternatively after the removal of each bar 7 or group of bars 7, the stripping tools 23 can be repositioned. Naturally also combinations of these two possibilities are applicable.

EXAMPLE 3

CUTTING OF THE INSULATION-FIG. 13

The rotor 3 is removed from the stator 1 and then the cuts 17 are realised using a saw. The cuts 17 are preferably realised only in the insulation 11 in order to reuse the conductors 10.

The cuts 17 are realised between the conductor 10 and the slots 4; the cuts 17 can be realised at one or both sides of the conductor 10 and they can extend for the whole insulation 11 of each bar 7 or only a part thereof.

When the cuts 17 are realised, the insulation 11 becomes weaker and the removal of the bar 7 is simplified.

EXAMPLE 4

CUTTING OF THE INSULATION AND CONDUCTOR-FIG. 14

After removal of the rotor 3, one (or also more if needed) cut 18 is realised in the insulation 11 and conductor 10. The cut 18 can extend over a part only of the conductor 10.

EXAMPLE 5

APPLICATION OF A CHEMICAL COMPOUND-FIG. 15

After rotor removal, a chemical compound 20 can be applied on the insulation 11, to cause the chemical decomposition thereof. The compound can be chosen according to the particular resin that impregnates the insulation 11.

Naturally the features described may be independently provided from one another.

In practice the materials used and the dimensions can be chosen at will according to requirements and to the state of the art.

The invention claimed is:

1. A method for removing a bar or coil from a slot of an electric machine, the method comprising:
   weakening bonding between the slot and the bar or coil that includes a conductor and insulation around the conductor; and
   then removing the bar or coil from the slot;
   wherein the bar or coil and the slot belong to a stator or rotor of the electric machine, which is a rotating electric machine, and the stator or rotor is realised by providing the bar or coil into the slot and then impregnating the stator or rotor with a resin.

2. The method according to claim 1, wherein weakening the bonding between the slot and the bar or coil includes heating at least a portion of the bar or coil.

3. The method according to claim 2, wherein the insulation around the conductor of the bar or coil includes an insulation impregnated with a resin, and wherein heating the at least a portion of the bar or coil includes heating at a glass transition temperature of the resin or at a temperature higher than the glass transition temperature of the resin.

4. The method according to claim 2, wherein heating the at least a portion of the bar or coil includes:
   defining a first temperature; and
   heating the at least a portion of the bar or coil at the first temperature.

5. The method according to claim 2, wherein heating the at least a portion of the bar or coil includes making a current to flow at least in the bar or coil.

6. The method according to claim 2, further comprising thermally insulating the at least a portion of the bar or coil to be heated.

7. The method according to claim 2, further comprising:
   covering the stator or rotor with an envelope; and
   heating the at least a portion of the bar or coil includes heating the stator or rotor and the bar or coil housed in the slot to a second temperature, further heating the at least a portion of the bar or coil.

8. The method according to claim 6, wherein heating the at least a portion of the bar or coil includes making a current to flow at least in the bar or coil.

9. The method according to claim 1, wherein weakening the bonding between the slot and the bar or coil includes cutting the bar or coil.

10. The method according to claim 9, wherein cutting the bar or coil includes cutting the insulation but not cutting the conductor.

11. The method according to claim 10, wherein the insulation extends between the conductor and the slot, and wherein cutting the bar or coil includes at least partly cutting the insulation between the conductor and the slot.

12. The method according to claim 9, wherein cutting the bar or coil includes cutting the insulation and the conductor.

13. The method according to claim 1, wherein weakening bonding between the slot and the bar or coil includes providing a compound on the insulation to cause chemical decomposition of the insulation.

14. The method according to claim 1, further comprising:
   removing the insulation from the conductor;
   providing a new insulation around the conductor; and
   assembling the bar or coil with the new insulation into the slot.

* * * * *